Patented Jan. 21, 1941

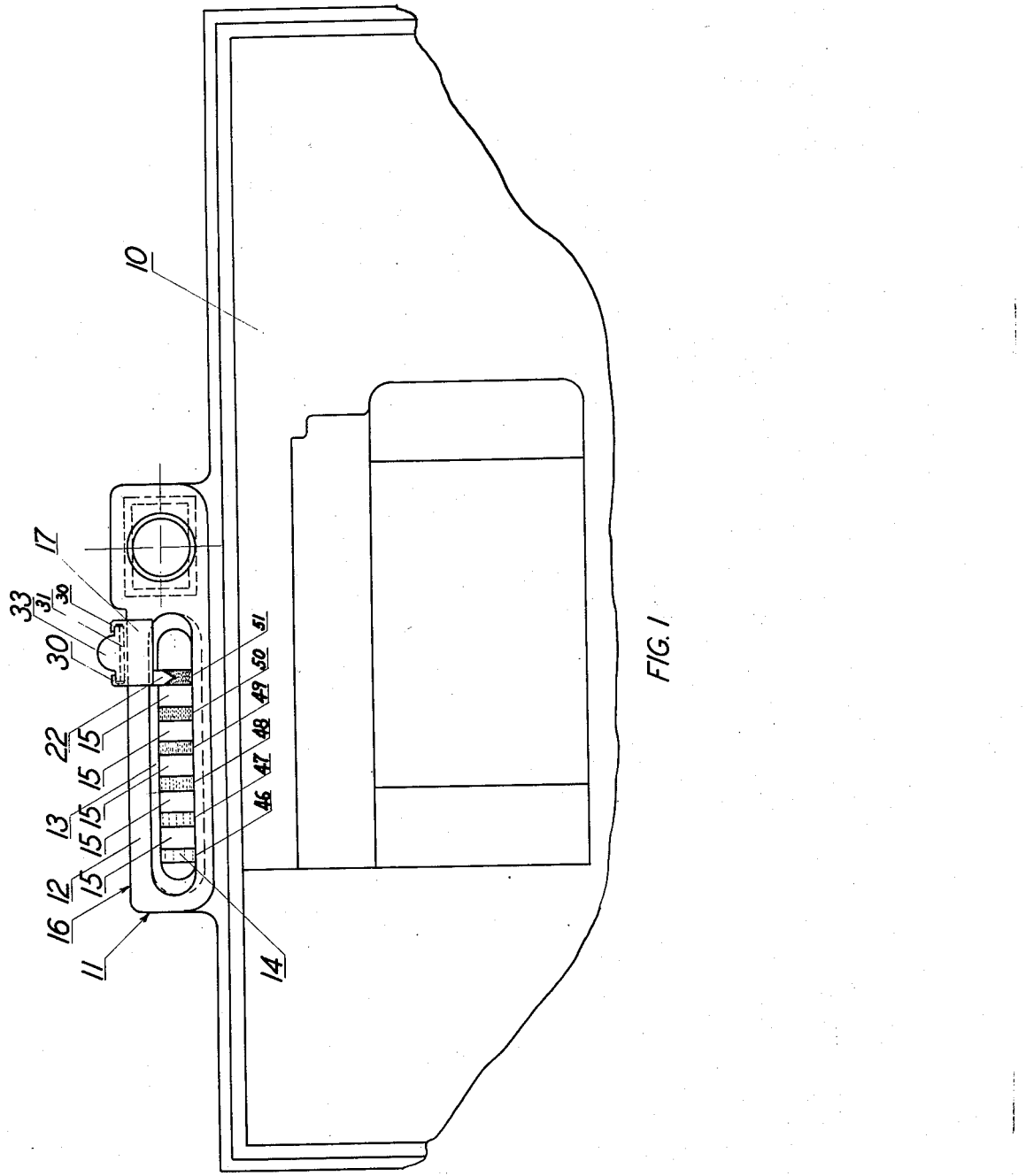

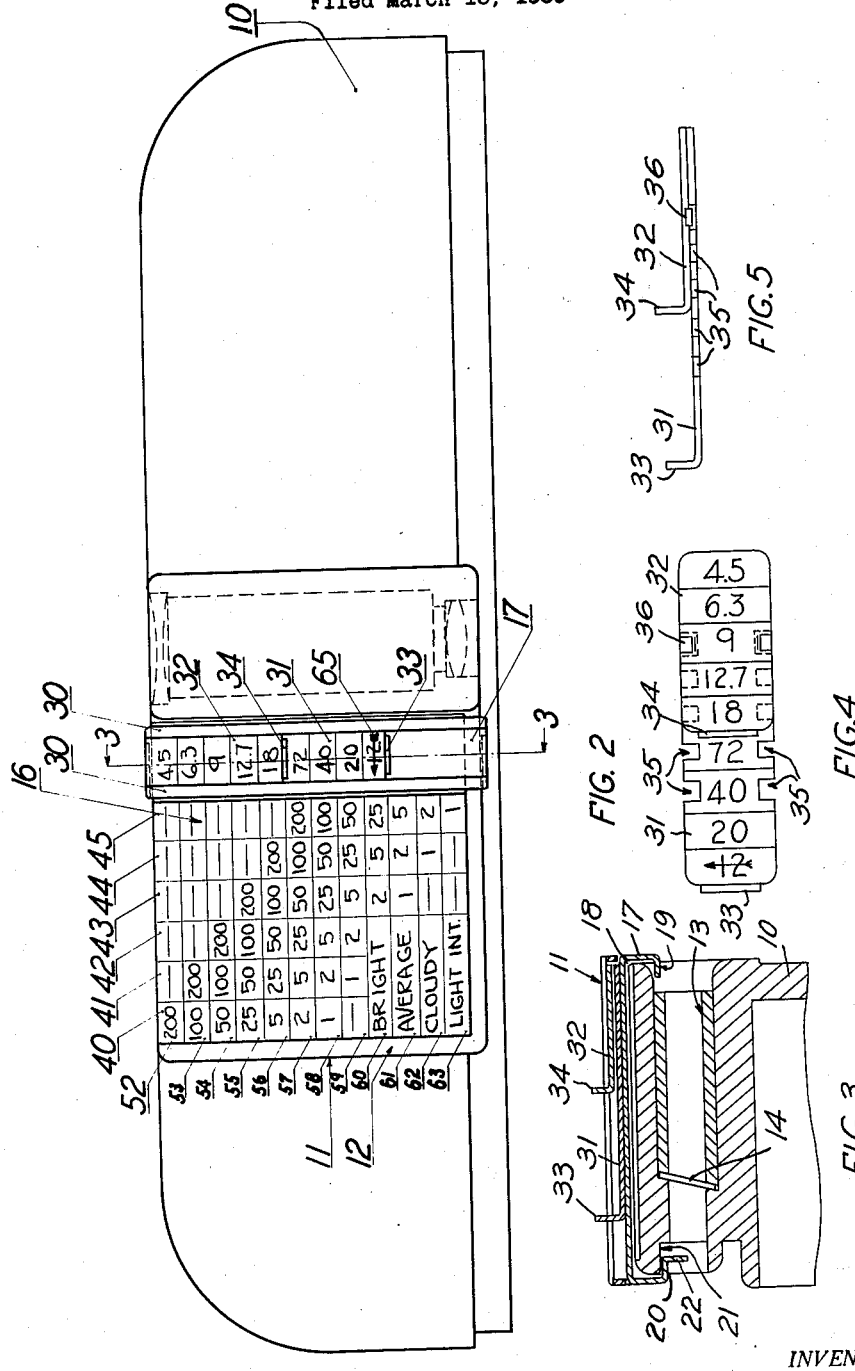

2,229,276

UNITED STATES PATENT OFFICE 2,229,276

EXPOSURE METER

William F. Carr, Ann Arbor, Mich., assignor to International Industries, Inc., a corporation of Michigan Application March 13, 1939, Serial No. 261,481

7 Claims. (Cl. 88—23)

This invention relates to cameras, and more particularly to an exposure meter therefor.

A primary object of this invention is the provision of an exposure meter or actinometer of the extinction type embodying a plurality of adjustable members whereby a direct reading of various essential factors may be obtained without the necessity of any mathematical calculation, or of reference to any scale separate from the exposure meter proper.

A secondary object is the provision of an exposure meter of relatively simple and efficient construction adapted to compensate for a relatively great number of those factors which effect the taking of a photograph of maximum excellence.

A still further object of this invention is the provision of an exposure meter having directly associated therewith a scale and a sliding member whereby the time of exposure may be read directly in accordance with the amount of light obtaining under a number of varying conditions.

A still further object is the provision of such an exposure meter which will be relatively simple and inexpensive of construction and which will be exceptionally reliable under a variety of conditions and which will further compensate to a large degree for the idiosyncrasies of individual eyesight.

Other objects will in part be obvious and in part be pointed out hereinafter.

The invention accordingly consists in the combinations of elements, arrangements of parts and features of construction all as will be more fully pointed out hereinafter and disclosed in the accompanying drawings wherein:

Figure 1 is a side elevational view of a camera embodying one form of this inventive concept.

Figure 2 is a top elevational view of the device of Figure 1.

Figure 3 is a sectional view taken along the line 3—3 of Figure 2.

Figure 4 is a top elevational view of certain constructional details and Figure 5 is a side elevational view of the device of Figure 4.

Similar reference characters refer to similar parts throughout the several views of the drawings.

Having particular reference now to Figures 1 and 2, there is generally indicated at 10 a camera body having affixed thereto in any desired manner, or possibly integral therewith, an exposure meter generally indicated at 11, of the extinction type.

Exposure meter 11 is comprised of a box-like housing 12 provided with a longitudinally extending slot-like aperture 13, extending the full depth thereof and having positioned therein a translucent strip 14 of divergent thickness or color whereby light viewed therethrough penetrates varying portions of the strip in accordance with the intensity of the said light. A plurality of opaque strips 15 are positioned interiorly of box 12 in order to divide strip 14 into a plurality of segments having the characteristic of varying light permeability. The arrangement of the strip is such that the thinnest or least opaque portion, or that portion permitting the passage of the greatest quantity of light, is positioned adjacent one end of slot 13 and in order of density the remainder of the portions of the strip appear adjacent or within successive individual apertures between opaque strips 15.

Positioned on top of box-like structure 12 is a scale generally indicated at 16 and divided into a plurality of vertical and horizontal columns, the purpose and content of which will be more fully described hereinafter.

Positioned on top of structure 12 is a slidable member 17 comprised of a base portion 18 having re-entrant extending members 19 and 20 adapted to engage the lower surface 21 of slot 13 whereby member 17 is held in slidable relation with the top of the exposure meter. Re-entrant member 20 is provided with a pointer 22 which extends into slot 13 in juxtaposed relation to strip 14, whereby as member 17 is slid transversely across the top of the view finder, the pointer is positioned adjacent a given segment of strip 14 for a purpose to be more fully pointed out hereinafter.

Secured to the upper portion of base 18 and preferably integral therewith are a pair of inwardly turned flanges 30 (see Fig. 1) adapted to retain in longitudinally slidable relationship therewith a pair of scale members 31 and 32 superposed one upon the other, each of which is provided with an upwardly extending portion 33 and 34 respectively, whereby to provide a finger grip permitting independent sliding of either of the scale members. Scale member 31 is provided with a plurality of notches 35 (see Figures 4 and 5) adapted to be engaged by a pair of opposed lugs 36 carried by scale member 32, the arrangement being such that movement of scale member 31 simultaneously moves scale member 32, but movement of scale member 32 may be effected independently of scale member 31 by imparting sufficient force thereto through member 34 to release lugs 36 from engagement with their associated notches 35, all for a purpose to be more fully pointed out herein.

Having reference now to scale 16, there are provided, as previously mentioned, a plurality of vertical columns 40—41—42—43—44 and 45, each of which is above and adjacent an aperture 46—47—48—49—50 and 51 respectively formed by opaque members 15 adjacent strip 14, thus each of the above enumerated columns corresponds to a different thickness of translucent strip 14. Disposed in each of columns 40 to 45 inclusive are a plurality of numerals, each of which designates the appropriate fraction of a second it is required that a film be exposed under varying conditions. For instance, in column 40, reading from top to bottom, appear the numerals 200—100—50—25—5—2 and 1, representing respectively one two-hundredth of a second, one one-hundredth of a second, one fiftieth of a second, one twenty-fifth of a second, one fifth of a second, one half of a second and one whole second. Similar numerals appear in each of the other columns. The scale is also divided into transverse columns 52—53—54—55—56—57—58—59—60—61—62 and 63. Numerals alone appear in columns 52 to 59 inclusively, but in columns 60 to 63 appear respectively the words "bright," "average," "cloudy" and "light int." (designation lighted interior.)

Scale member 31 bears the numerals reading from top to bottom 72—40—20 and 12, indicating film speed as determined by the type of film utilized. Scale member 32 bears the numerals reading from top to bottom 4.5—6.3—9—12.7 and 18, designating the diaphragm aperture setting. All of the above numerals are of an arbitrary character and are set forth in detail only as conducive to a clearer understanding of this inventive concept. It will be understood that numerals corresponding to any desired duration of shutter speed or any type of film or diaphragm aperture setting may be utilized in accordance with desired or requisite conditions. Placed adjacent numeral 12 on scale member 31 is an arrow 65.

The operation of this device is therefore as follows:

The operator first determining the light condition under the particular circumstances, that is whether the day is bright, average or cloudy, places arrow 65 adjacent the corresponding word in column 60—61—62 or 63, then according to the speed of film utilized moves scale member 32 with respect to scale member 31 until member 34 is immediately above the number corresponding to the speed of film utilized, then placing the eye adjacent slot 13 determines the last of apertures 46 to 51 inclusive through which he is able to see light. Member 17 is then slid along the top of box-like housing 12 until pointer 22 is adjacent the selected aperture. Then upon removing the device from the eye and examining the scale it will be seen that the numeral immediately adjacent a given diaphragm aperture setting corresponds in fractions of a second, as above pointed out, to the time of exposure required under the specific conditions set out.

In the position shown, for example, a high speed film is being utilized on a bright day under conditions of maximum light intensity and accordingly the number 200 adjacent film speed 72 and the blank spaces thereabove indicate that absolute minimum shutter speed time is required to produce the most effective picture. It will be understood that under conditions of lesser light intensity as the scale is moved toward the left, as viewed in Figures 1 and 2, different numerals will appear adjacent numerals indicating diaphragm aperture setting and will indicate various fractions of a second exposure required.

Now from the foregoing it will be seen that there is herein provided a structure accomplishing all the objects of this invention and others, including many advantages of great practical utility.

As many embodiments may be made of this inventive concept and as many modifications may be made in the embodiment herein set forth and shown, it is to be understood that all matter hereinbefore set forth or shown in the accompanying drawings is to be interpreted merely as illustrative and not in a limiting sense.

I claim:

1. In a device of the character described, in combination, a housing having a sighting aperture therein, a translucent strip having progressively varying characteristics of light permeability positioned in said housing in alignment with said aperture, a scale comprising rows and columns of exposure data and carried by said housing, a member slidably mounted on said housing adjacent said strip and said scale, a pointer on said member designating a given light permeability characteristic of said strip, a second member carried by but movable independently and transversely of said first mentioned member, and indicating means on said second member juxtaposed to said scale.

2. In a device of the character described, in combination, a housing having a sighting aperture therein, a translucent strip having progressively varying characteristics of light permeability positioned in said housing in alignment with said aperture, a scale carrying rows and columns of exposure data carried by said housing, a slidable member slidably mounted on said housing adjacent said strip and said scale, a pointer on said member designating a given light permeability characteristic of said strip, a second member carried by the first member bearing exposure data slidable with said first member in one direction but slidable independently thereof in the transverse direction and adapted to cooperate with said first scale, and a third member also bearing exposure data adapted to cooperate with both of said first and second scale members being slidable with both said first and second members in one direction and movable relatively to each of said first and second members in another direction.

3. In a device of the character described, in combination, a housing having a sighting aperture therein, a translucent strip having progressively varying characteristics of light permeability positioned in said housing in alignment with said aperture, a scale carrying rows and columns of exposure data carried by said housing, a slidable member slidably mounted on said housing adjacent said strip and said scale, a pointer on said member designating a given light permeability characteristic of said strip, a second scale member bearing exposure data slidable with said first member in one direction but slidable independently thereof in the transverse direction and adapted to cooperate with said first scale, and a third member also bearing exposure data adapted to cooperate with the first and second named members and positioned in overlying relationship to said second member, said third member being slidable with both of said first and second members in one direction and movable relatively to each of said first and second members in another direction.

4. In a device of the character described, in combination, a housing having a sighting aperture therein, a translucent strip having progressively varying characteristics of light permeability positioned in said housing in alignment with said aperture, a scale having rows and columns of exposure data thereon carried by said housing, a member having exposure data thereon slidably mounted on said housing adjacent said scale, a pointer on said member adjacent said strip for designating a given light permeability of said strip, a second member movably mounted on the first named member and indicating means on said second member cooperating with the exposure data on said strip and said first named member.

5. An exposure meter comprising a housing having a sighting aperture therein, a translucent strip having progressively varying characteristics of light permeability positioned in said housing in alignment with said aperture, a scale having shutter speed data arranged in rows and columns carried by said housing, a member having a column of film speed data thereon slidably mounted on said housing for movement across said scale, a pointer on said member adjacent said strip for designating a given light permeability characteristic of said strip, and a second member having lens speed data thereon slidably mounted on the first named member for cooperating with the data on the scale and first named member.

6. An exposure meter comprising a housing having viewing aperture therethrough, a plurality of translucent segments of different light transmission positioned in said aperture, a scale carried by said housing and having a column of exposure data thereon for each segment, a carriage slidably mounted on said housing adjacent said scale and having a column of exposure data thereon, a pointer on said carriage adjacent said viewing aperture for positioning said carriage adjacent a particular column in accordance with the light transmission of the corresponding segment, a member slidably mounted on said carriage and means on said member for indicating a specific exposure in the particular column.

7. An exposure meter comprising a housing having a viewing aperture therethrough, a plurality of translucent segments of different light transmissions positioned in said aperture, a scale carried by said housing and having a column of shutter speed data thereon for each segment, a carriage slidably mounted on said housing adjacent said scale and having a column of film speed data thereon, a pointer on said carriage adjacent said viewing aperture for positioning said carriage adjacent a particular column of shutter speed data in accordance with the light transmission of the corresponding segment, a member slidably mounted on said carriage and lens speed data on said member for indicating a specific exposure in the particular shutter speed data column.

WILLIAM F. CARR.